Figure 1:
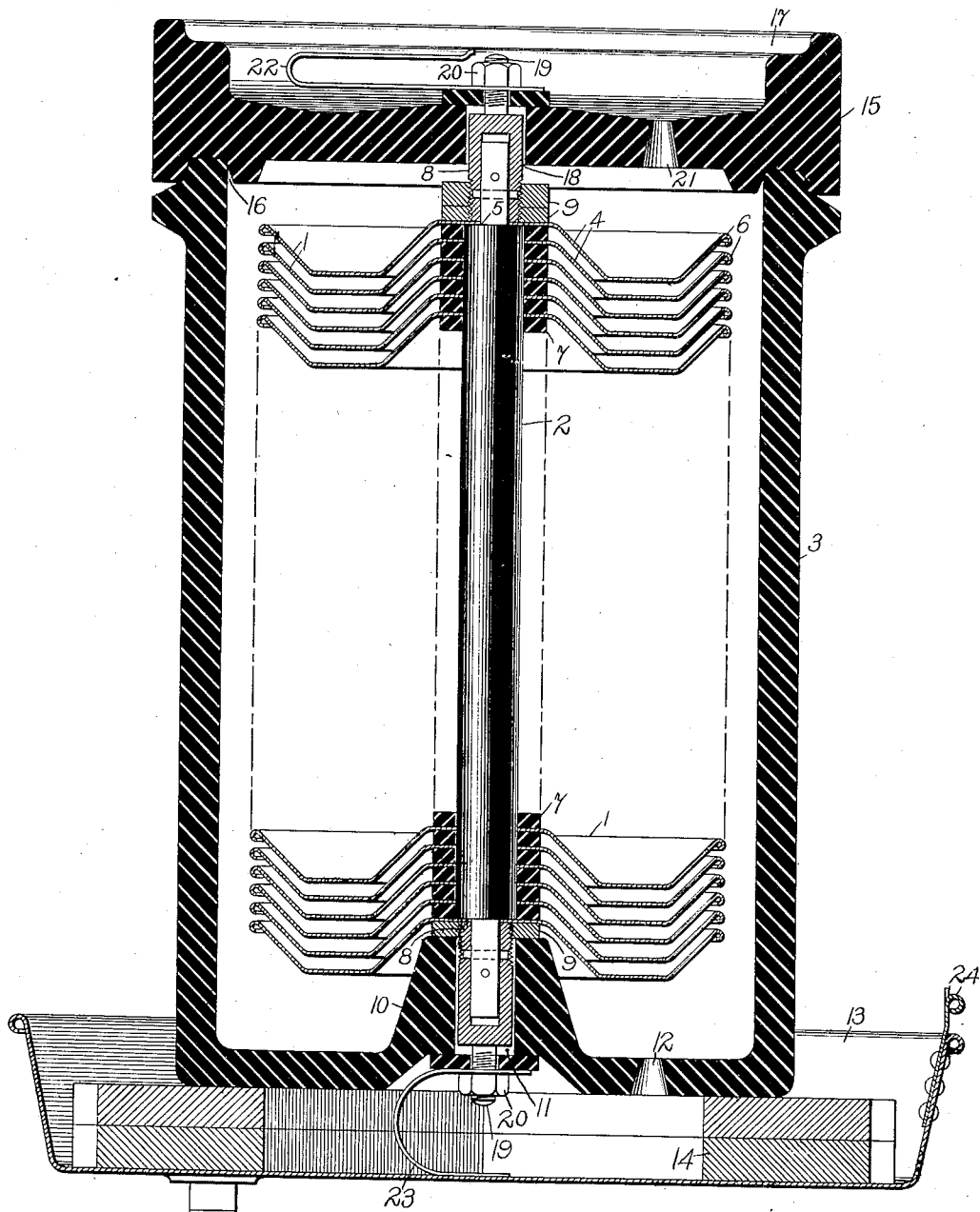

No. 891,995. PATENTED JUNE 30, 1908.
R. B. INGRAM.
ELECTROLYTIC CELL.
APPLICATION FILED OCT. 24, 1906.

2 SHEETS—SHEET 1.

WITNESSES:
Fred H. Miller
R. B. Dearborn

INVENTOR
Ralph B. Ingram
BY
Tresley G. Carr
ATTORNEY

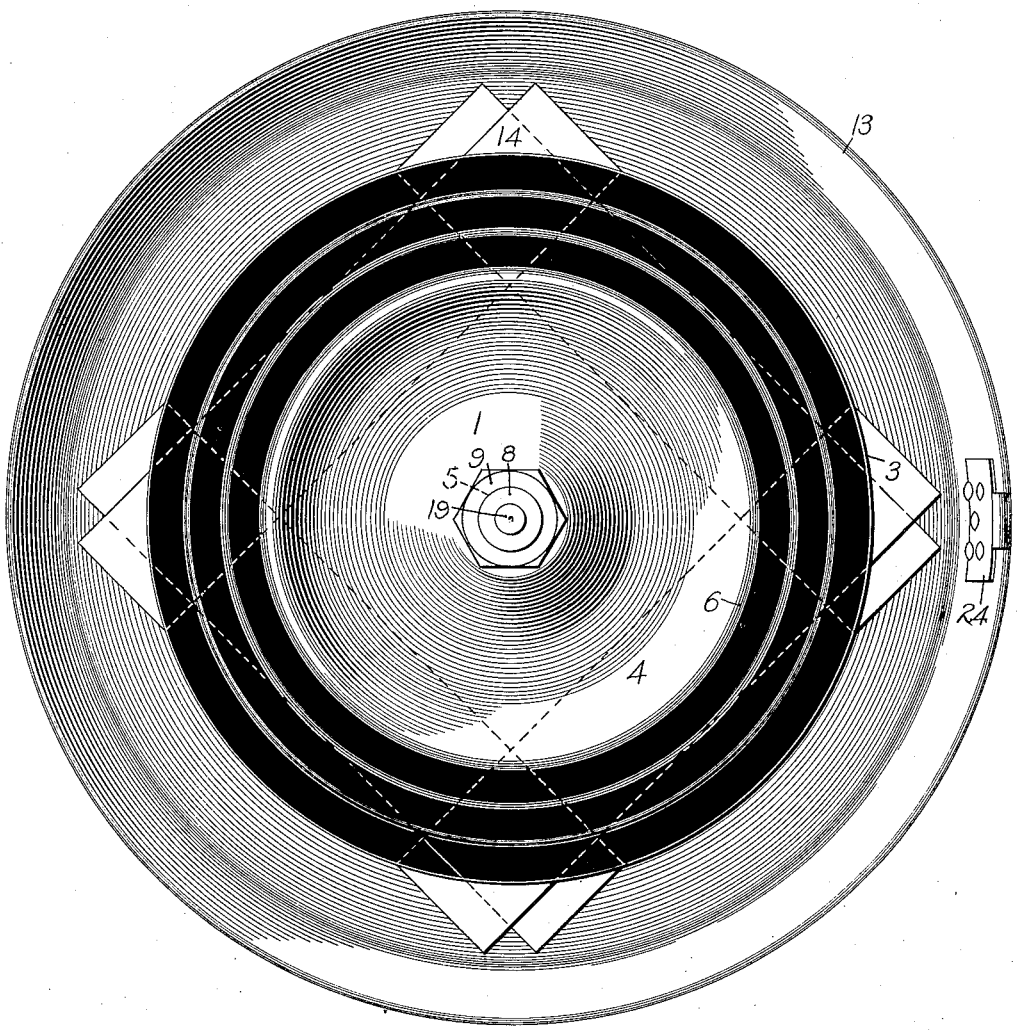

UNITED STATES PATENT OFFICE.

RALPH B. INGRAM, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

No. 891,995.     Specification of Letters Patent.     Patented June 30, 1908.

Application filed October 24, 1906. Serial No. 340,256.

*To all whom it may concern:*

Be it known that I, RALPH B. INGRAM, a citizen of the United States, and a resident of Wilkinsburg, in the county of Allegheny and State of Pennsylvania, have invented a new and useful Improvement in Electrolytic Cells, of which the following is a specification.

My invention relates to electrolytic cells and it has for its object to provide an improved electrolytic cell of the tray plate type that shall be simple and durable in construction and specially adapted for use in connection with lightning arresters or other devices in which a well known electrolytic valve action is produced.

Storage batteries and other similar devices have often comprised a plurality of similar plates in the form of trays separated from each other by insulating spacers and so arranged that the electrolyte overflowing from each tray, except the lowermost one, entered the tray next below. When cells or batteries are arranged in the aforesaid manner, the plates do not come into contact with the wall of the liquid-containing tank and, consequently, they have an advantage over the more usual forms, in which the several plates are supported and separated from each other by recesses in or projecting from the walls of the tank.

The tray plates of my invention have advantages over the tray plates of the prior art in that they are more easily assembled and are separated by insulation which is never immersed in the electrolyte and are also of such form as to insure a maximum degree of rigidity. The structure is also such that the live or active parts of the cells are unimpaired by contact with insulating supports or spacers of any character.

My invention is illustrated in the accompanying drawings in which

Figure 1 is a sectional elevation of an electrolytic cell constructed in accordance therewith, and Fig. 2 is a plan view, with the cover removed, of the cell shown in Fig. 1.

Referring to the drawings, the cell illustrated therein comprises a series of plates 1, constructed of aluminum or other material, according to the service for which the cell is adapted, that are assembled upon a vertical insulating rod 2 in a fluid-containing jar or tank 3. The plates which have the general form of trays, are substantially alike and are provided with centrally located frusto-conical indentations 4 that extend upwardly from their interior and with holes 5 which are so located in the center of the indentations that the plates may be readily assembled on the insulating rod 2. The upper flat surface of the indentation in each plate is materially higher than an outer flange 6 and, consequently the top of the indentation will not be submerged when the plate is filled with liquid to overflowing.

The several plates are separated from each other and are supported by insulating rings or collars 7 which are also assembled on the vertical rod 2. Ferrules 8 of conducting material are attached to the ends of the insulating rod and are screw-threaded to receive clamping nuts 9 which are adapted to hold the assembled plates in position and to make an electrical connection between the end plates and the ferrules. The plates, when assembled in the aforesaid manner, may be disposed with their centers in a vertical line in any suitable inclosing tank or casing. The casing illustrated in the drawings comprises a stone or earthenware jar, the base of which has a centrally located inward projection 10 upon which the assembled plates may be supported, the lower clamping nut 9 resting upon the top of the projection and the ferrule 8 extending through a hole 11 in its center. The electrolyte, which would otherwise collect in the bottom of the jar, flows through a port 12 into a tray or dish 13 having a suitable rack 14 by which the jar itself is supported. The jar is provided with a cover 15 having an annular groove 16 which engages its rim and a second annular groove 17 which is adapted to receive and support another jar similar to the jar 3, in case several cells are assembled in a group or battery. The center of the cover is provided with an opening 18 through which the upper ferrule 8 may extend and both the upper and the lower ferrules are provided with relatively small screw-threaded projections 19 having engaging nuts 20 whereby the cover of the jar may be rigidly held in position. A port or opening 21, similar to the port 12, is located in the cover and a suitable electrolyte may be supplied to the top plate through this opening. Leads of conducting material 22 and 23 are respectively connected to the upper and lower ferrules, the lower lead 23 making an electrical connection between the bottom plate and the tray 13. The tray 13 is provided with a tap 25 through which the accumulated electrolyte may be drawn and with a terminal piece 24.

The plates may be of any convenient outline, but a proportionately greater active surface may be obtained for a given diameter of cell by employing circular plates of the form shown in the drawings.

It will be readily understood that the cell illustrated may be employed for various purposes and that changes in size and arrangement of details may be effected within the scope of my invention.

I claim as my invention:

1. An electrolytic cell comprising a plurality of similar fluid-containing trays each having a central frusto-conical indentation, and means for supporting each plate at a point above the maximum liquid level in the plate below.

2. An electrode for electrolytic cells comprising a tray shaped plate having a central frusto-conical indentation.

3. An electrolytic cell comprising a plurality of similar circular fluid-containing trays, each having a central frusto-conical indentation and means for separating and supporting the plates at short distances from each other.

4. An electrolytic cell comprising a plurality of similar tray-shaped plates having upwardly extending frusto-conical indentations, a vertical supporting rod, and spacing means, whereby each plate is supported above its maximum liquid level and at a predetermined distance from each of the adjacent plates.

5. An electrolytic cell comprising a plurality of similar tray-shaped plates having upwardly extending frusto-conical indentations, a vertical supporting rod therefor, insulating spacers between the adjacent plates, and a containing tank in which the assembled plates are disposed.

6. An electrolytic cell comprising a plurality of similar tray-shaped plates having upwardly extending frusto-conical indentations, a containing tank having a centrally located projection, and supporting means for the plates comprising a vertical rod seated in the tank projection.

7. An electrolytic cell comprising a containing tank, the base of which has a centrally located inward projection, a vertical insulating rod supported therefrom, a plurality of plates mounted on the rod, and separating collars between the plates.

8. An electrolytic cell comprising a containing tank, the base of which has a centrally located inward projection, a vertical insulating rod supported therefrom, a plurality of similar fluid-containing trays having frusto-conical indentations, and means for mounting the trays upon the vertical rod, whereby the point of support for each tray is above maximum liquid level of the adjacent tray below.

9. An electrolytic cell comprising a containing tank, the base of which has a centrally located inward projection, a vertical insulating rod supported therefrom, a plurality of similar fluid-containing trays mounted on the rod, insulating spacing collars between the adjacent trays, and external terminals to which the end trays are connected.

10. An electrolytic cell comprising a containing tank, the base of which has a centrally located inward projection, a vertical insulating rod supported therefrom, a plurality of similar fluid-containing trays, having central frusto-conical indentations mounted on the rod, and insulating separators which are mounted on the rods between the trays.

In testimony whereof, I have hereunto subscribed my name this 22nd day of October, 1906.

RALPH B. INGRAM.

Witnesses:
A. M. DUDLEY,
R. P. JACKSON.